Figure 1:
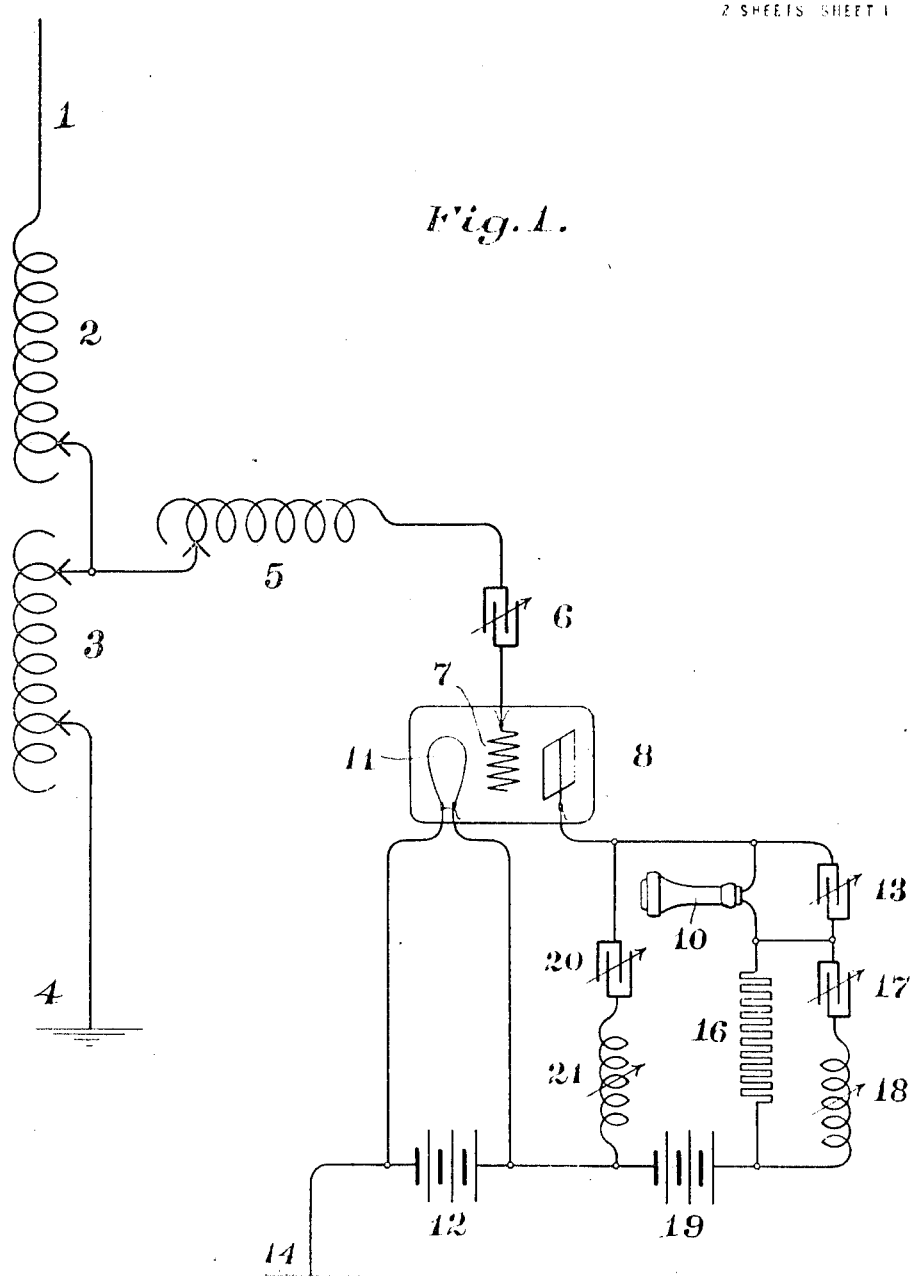

R. A. WEAGANT.
RECEIVER OF ELECTRICAL OSCILLATIONS.
APPLICATION FILED APR. 25, 1914.

1,313,654.

Patented Aug. 19, 1919.
2 SHEETS-SHEET 2.

Witnesses:
M. S. MacIntyre
Wm. W. Earl

Inventor
Roy A. Weagant
By his Attorneys

UNITED STATES PATENT OFFICE.

ROY A. WEAGANT, OF ROSELLE PARK, NEW JERSEY, ASSIGNOR TO MARCONI WIRELESS TELEGRAPH COMPANY OF AMERICA, A CORPORATION OF NEW JERSEY.

RECEIVER OF ELECTRICAL OSCILLATIONS.

1,313,654.     Specification of Letters Patent.     Patented Aug. 19, 1919.

Application filed April 25, 1914. Serial No. 834,305.

*To all whom it may concern:*

Be it known that I, ROY A. WEAGANT, a citizen of the United States, and a resident of Roselle Park, in the county of Union, State of New Jersey, have invented certain new and useful Improvements in Receivers of Electrical Oscillations, of which the following is a specification.

My invention relates to receivers for electrical oscillations, and is applicable to the reception, detection and amplification of various kinds of oscillations such as continuous oscillations and damped oscillations.

My invention may be advantageously used in connection with wireless telegraphy, although it may be used in other kinds of signaling, such as wire telegraphy and telephony and wireless telephony.

In the drawings annexed hereto and forming part of this specification, I have shown forms my invention may take, although it is capable of considerable variation, the forms shown being two which may be used when it is applied to wireless telegraphy.

Referring to Figure 1 I have shown an aerial at 1, which includes an aerial tuning inductance 2 and the primary of a transformer 3. The aerial is earthed or connected to a suitable capacity as usual at 4. Coupled to the aerial either directly or inductively is a secondary circuit which includes an inductance 5 having in series with it a variable condenser 6, which is connected to one element 7 of a detector. This detector preferably consists of a sealed vessel inclosing a plurality of elements separated by a conductive gaseous medium, although other forms might be used.

Another element 8 of the detector, preferably a cold element, is connected to a local circuit which includes an indicating device such as a telephone 10 shunted around which is a variable condenser 13. In series with telephone 10 is placed a relatively large resistance 16 shunted by a condenser 17 in series with an inductance 18. Resistance 16 is connected in series with a battery 19 preferably of relatively high voltage, which is connected to one of the elements of the detector, preferably the negative side of the hot element 11. The hot element may be in the form of a filament kept at incandescence by means of a battery 12 in the usual manner and may be connected to the earth as at 14, although this earth connection is not essential. Connected across the local circuit and connecting elements 8 and 11 is a condenser 20 in series with an inductance 21. These are both preferably adjustable, so that they may be varied to secure the best effects. Inductance 21 is used when receiving continuous oscillations, and is not essential for receiving damped oscillations, except when they are very weak.

Condenser 17 and inductance 18 permit of the tuning of a circuit, including the telephone, to the group frequency, so that in the event of the apparatus being used to receive damped oscillations the effects produced by the groups of oscillations are very much magnified.

In using the apparatus to receive continuous oscillations, the inductance 18 may be dispensed with.

Figure 2:
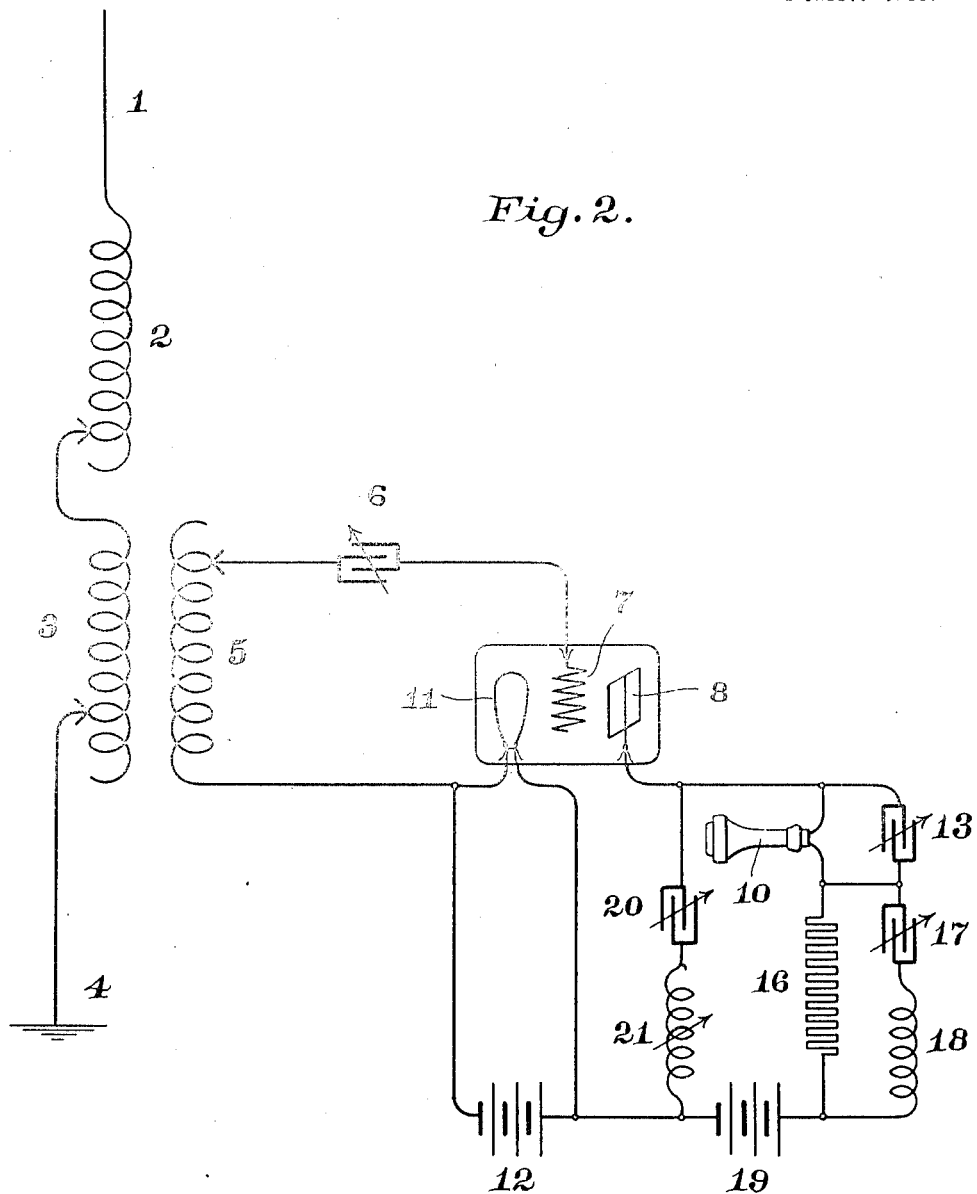

In Fig. 2 I have shown a modification of my apparatus which consists in using a closed secondary circuit which includes the inductance 5 and capacity 6 instead of the open circuit shown in Fig. 1. I have also shown in Fig. 2 a structure in which the filament element 11 of the detector is ungrounded, this being an alternative arrangement to that shown in Fig. 1. The operation, however, of either modification is essentially the same.

The method of operating my device is as follows:

The hot element 11 is first adjusted to incandescence. The potential of the battery 19 is adjusted to a point such that the incoming signals give a maximum response. I then vary separately the resistance 16, the inductance 18, the condenser 17, the condenser 13, the condenser 20, and the inductance 21, until the maximum effect of each is obtained. The usual adjustments of the aerial circuit and of the inductance 5 and condenser 6 are made in conjunction with the above mentioned adjustments of the local circuit.

The adjustment I have just described is that ordinarily used when damped oscillations are to be received. When continuous oscillations are to be received it is preferable to adjust the potential of battery 19 to such a point that there is heard in the telephone receiver 10 a high pitched note. This adjustment is generally to a higher voltage than that ordinarily employed for receiving damped oscillations with detectors of this type. For example, I have used in practice a voltage as high as 100 volts and a resistance of 75,000 ohms. Having obtained this high note in the telephone receiver, the capacity of condenser 13 is reduced until this note is no longer heard, or is very slight. The same result may be obtained by adjustment of condenser 20 instead of condenser 13, or by a combined adjustment of the two.

What I claim is:

1. The method of receiving substantially continuous radio oscillations comprising impressing a sufficiently high electro-motive force on a local circuit of a vacuous receiver to produce a note in a telephone included in said local circuit, and thereafter adjusting a shunt to said telephone so as to eliminate said note while maintaining said electro-motive force.

2. In a receiver of electrical oscillations, a vacuous detector, comprising a hot filament and a cold electrode and adapted to detect the received oscillations, a circuit directly connecting the hot filament and the cold electrode of said detector containing a capacity, and a second circuit connecting the same elements containing a non-inductive resistance, a battery and an indicating instrument responsive to the detecting action of said detector.

3. In a receiver of electrical oscillations, a vacuous detector, comprising a hot filament and a cold electrode and adapted to detect the received oscillations, a circuit connecting the hot filament and cold electrode of said detector containing an inductance and capacity, a second circuit connecting the same elements containing a battery and a non-inductive resistance in series, and an indicating instrument responsive to the detecting action of said detector.

4. In a receiver of electrical oscillations, a vacuous detector, comprising a hot filament and a cold electrode, a circuit connecting the hot filament and cold electrode of said detector containing a capacity, a second circuit connecting the same elements containing a battery, a resistance and an indicating instrument, and a capacity shunting the resistance.

5. In a receiver of electrical oscillations a circuit connecting two elements of a detector containing a capacity and a second circuit connecting the same elements containing a battery and a resistance in series and an indicating instrument, and a capacity shunting the resistance.

6. In a receiver of electrical oscillations a circuit connecting two elements of a detector containing a capacity and an inductance and a second circuit connecting the same elements containing a battery and a resistance in series and an indicating instrument and a capacity shunting the resistance.

7. In a receiver of electrical oscillations a circuit connecting two elements of a detector containing a capacity and an inductance in series, a second circuit connecting the same elements containing a battery and a resistance in series and an indicating instrument, and an inductance and a capacity in series shunting the resistance.

8. In a receiver of electrical oscillations a circuit connecting two elements of a detector containing an inductance and a capacity in series, a second circuit connecting the same elements containing a battery and a resistance in series and an indicating instrument, a capacity shunting the indicating instrument, and a capacity and an inductance in series shunting the resistance.

9. In a receiver of electrical oscillations a detector comprising a plurality of elements, means for heating one of said elements, a circuit connecting the heated element and another element of the detector containing a capacity and an inductance in series, a second circuit connecting the same elements containing a battery and a resistance in series and an indicating instrument, a capacity shunting the indicating instrument and a capacity and inductance in series shunting the resistance.

10. In a receiver of electrical oscillations, a vacuous detector comprising a hot filament and a cold electrode, a circuit directly connecting the hot filament and the cold electrode containing a capacity and radio frequency tuning inductance, and a second circuit directly connecting the same elements containing a battery and an indicating instrument.

11. An apparatus for receiving radio signals comprising a vacuous detector having hot and cold electrodes; a local circuit connecting said electrodes including a source of current, a resistance, and a telephone; said source of current being capable of adjustment to give a note in said telephone, and a shunt for said telephone capable of adjustment to extinguish said note without disturbing the adjustment of said source.

12. In a receiver of electrical oscillations, a vacuous detector comprising a hot electrode and a cold electrode, and a circuit connecting said electrodes containing a battery, a non-inductive resistance and a telephone arranged in series, and a capacity shunting said telephone.

13. In a receiver of electrical oscillations, a vacuous detector comprising a hot electrode and a cold electrode, a circuit connecting said electrodes containing a battery, a resistance and a telephone arranged in series, a capacity shunting said telephone, and a second capacity shunting said resistance.

14. In a receiver of electrical oscillations, a vacuous detector comprising a hot electrode and a cold electrode, a circuit connecting said electrodes containing a battery, a resistance and a telephone arranged in series, a capacity shunting said telephone, and a second circuit connecting said electrodes containing capacity.

15. In a receiver of electrical oscillations, a vacuous detector comprising a hot electrode and a cold electrode, a circuit connecting said electrodes and containing a battery, a resistance and a telephone arranged in series, a capacity shunting said telephone, a second capacity shunting said resistance, and an additional circuit connecting said electrodes containing capacity.

16. In a receiver of electrical oscillations, a vacuous detector comprising a hot electrode and a cold electrode, and a circuit connecting said electrodes containing a battery, a non-inductive resistance and a telephone arranged in series, and a capacity shunting said telephone but in series with said resistance.

In witness whereof I have hereunto signed my name in the presence of two witnesses.

ROY A. WEAGANT.

Witnesses:
    Geo. G. Delvaille,
    E. Eternod.